March 22, 1949.  H. G. KAMRATH  2,464,870
OIL FILTER

Filed March 24, 1945  2 Sheets-Sheet 1

Inventor
Herbert G. Kamrath
By Blackmore, Spencer & Flint
Attorneys

March 22, 1949.    H. G. KAMRATH    2,464,870
OIL FILTER

Filed March 24, 1945    2 Sheets-Sheet 2

Inventor
Herbert G. Kamrath
By Bachman, Spencer & Hunt
Attorneys

Patented Mar. 22, 1949

2,464,870

UNITED STATES PATENT OFFICE 2,464,870

OIL FILTER

Herbert G. Kamrath, Flint, Mich., assignor to General Motors Corporation, Detroit, Mich., a corporation of Delaware Application March 24, 1945, Serial No. 584,576

10 Claims. (Cl. 210—165)

1

The invention herein described is an improved oil filter. It is intended more particularly for use with engines to filter the oil used for lubrication.

An object is to provide an efficient, simple and comparatively inexpensive filter to be placed in the conduit of an oil circulating system between a conventional pump and the bearings to be lubricated. Other objects and advantages will be understood from the description which follows.

Figure 1:
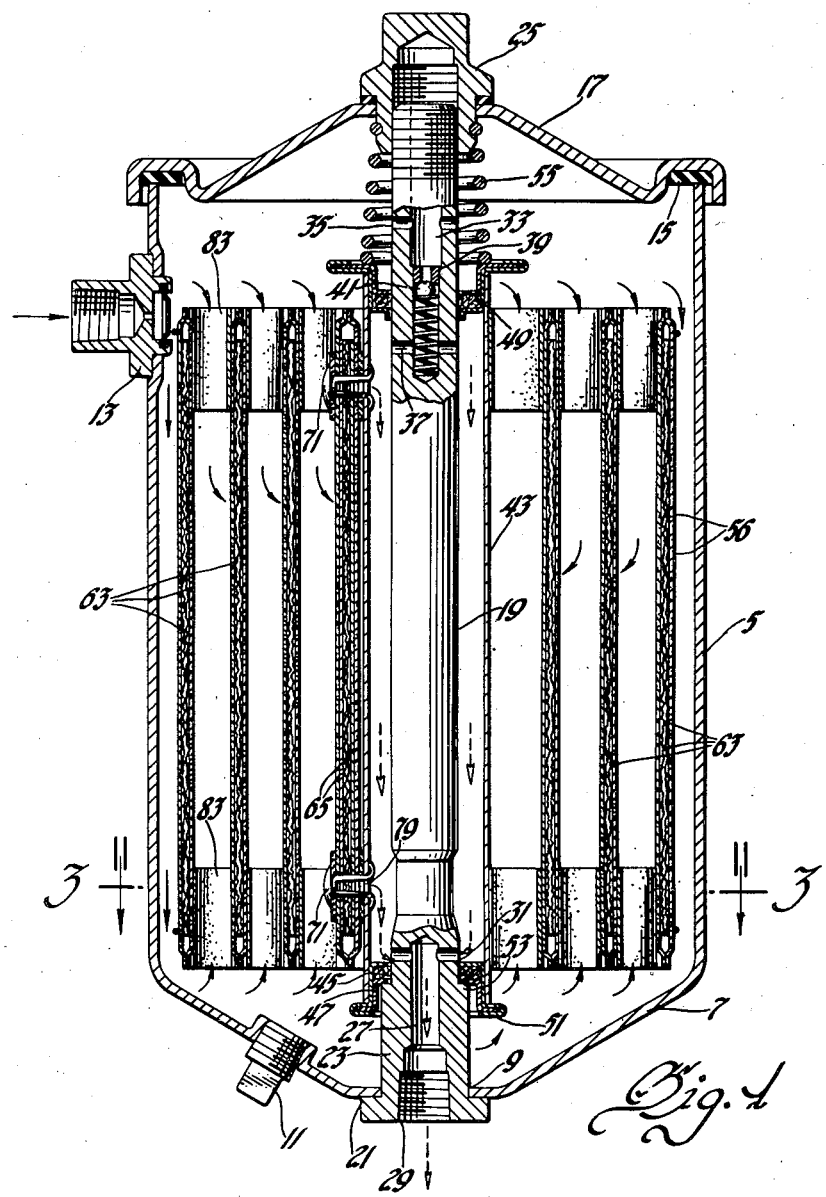
Figure 2:
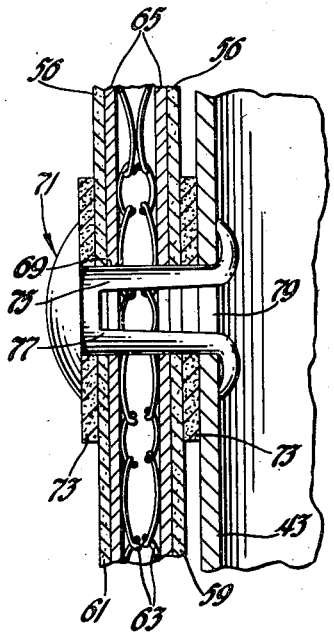
Figure 3:
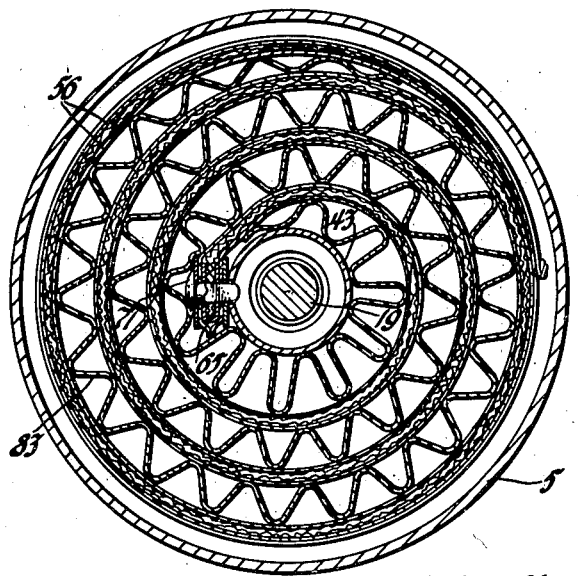
Figure 4:
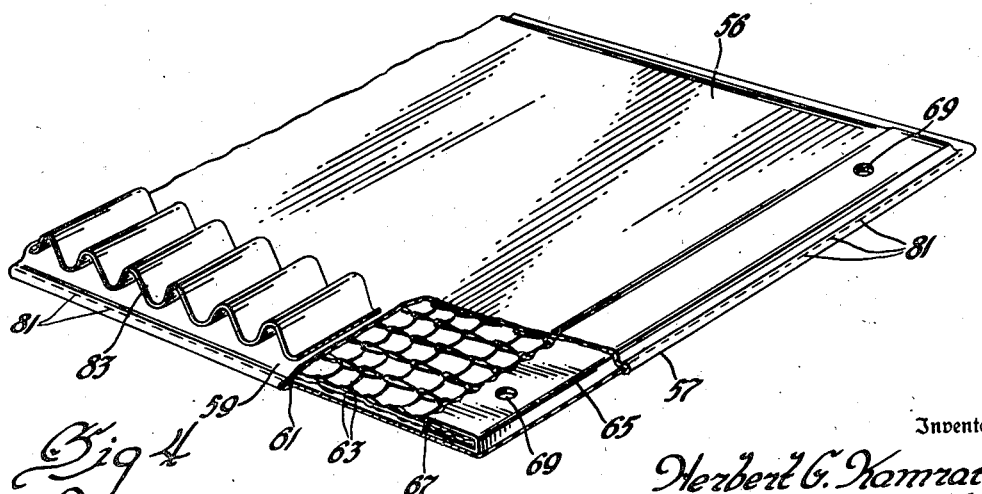

On the accompanying drawings:

Fig. 1 is a longitudinal section through the filter. Fig. 2 is an enlarged section of a part shown in Fig. 1. Fig. 3 is a transverse section through the filter, the plane of the section being indicated on Fig. 1. Fig. 4 is a view in perspective, partly broken away, to illustrate the filtering member.

Referring by reference numerals to the drawings, the filter is shown as housed within a casing 5 of generally cylindrical form and having a conical end at 7. In that end there is an axial opening 9 and a second drain opening closed by a removable plug 11. The side wall has an opening to receive an oil inlet fitting 13.

Over the upper end of casing 5 is a gasket 15. A conical cover 17 at its periphery is in contact with the gasket. To complete the housing assembly is a center post 19. It has a shoulder 21 near one end 23. The center post is projected through the center opening 9 and its shoulder contacts with the casing end 7 around the opening. The center post extends through the casing to a point near the cover 17 and is there threaded to engage a locking nut 25 which is shouldered to engage and position the cover 17 against the gasket 15. The center post has near end 23 an axial passage 27 internally threaded at 29 to engage a conduit, not shown, to carry filtered oil to the bearings. At the inner end of passage 27 radial passages 31 afford communication between passage 27 and the outside of the post. At the other end of the post 19 is an axial passage 33 communicating with the region outside the post by spaced radial passages 35 and 37. Within passage 33 is an apertured plug 39 engaged by a spring-pressed ball 41.

The filtering element is within the casing and assembled on the center post. It is built about and upon a center tube 43. Two concentric sleeves such as 45 and 47 so marked at one end, are fitted within each end of the center tube. Each sleeve has an internally directed flange between which flanges is a sealing ring 49. These sealing rings prevent communication between the

2 annular space between the post and tube and the remainder of the space within the casing. At the ends of the tube the sleeves are formed with outwardly directed flanges one, such as 51, being longer than the other and bent over it to clamp the two together. When the center tube is assembled within the casing the inner flange of sleeve 47 rests on a shoulder 53 of the center post. A spring 55 between the cap or nut 25 and the longer outward flanges of the sleeves at the other end of the center tube is compressed in securing the locking nut to the post to hold the tube firmly against the shoulder 53.

The filtering element is made from a strip of paper 56 having a width a little less than the length of the center tube. It is folded at about the middle of the length as at 57 to form a double layer 59, 61 so marked on Fig. 4. Between layers 59 and 61 there is placed a separator 63 in the form of a copper wire mesh element of substantially the same dimension as each paper layer 59 or 61. In assembling the paper and separator there is placed within the fold 57 of the paper a metallic collector manifold 65. It is, when assembled, of U-shape and embraces the end of the separator 63. It has teeth 67 on one edge to enter the spaces of the separator. The collector manifold has openings 69 in each of its two sides to receive rivets to hold the paper and separator to the center tube. Fig. 2 shows that the rivets 71 pass through washers 73 as well as through the layers of paper, the collector manifold and the separator. Also Figure 2 clearly shows that, in addition to the openings 69 in the manifold 65, the layers of filter material have aligned holes registering with openings 69. The rivets 71 are split to form two legs 75 and 77 the ends of which pass through holes 79 in the center tube where they are bent over as shown. The split part of each rivet is sufficiently long so that there is free communication from within the tube to the region within the fold of the paper. The edges of the paper along three sides and the fold are stitched as shown at 81. The filter paper element is then wrapped spirally around the center tube, there being placed between the folds near the ends, strips of corrugated paper 83 to space the folds as best shown by Fig. 3. After wrapping the paper to a cylindrical form, it may be held from unwrapping in any convenient way. It is then assembled on the center post between the shoulder 53 and the spring 55 as explained.

As the oil to be filtered enters the casing at 13 it passes around the side, top and bottom of the filter unit. It passes transversely through the layers of paper and traverses spirally around in the space resulting from the use of the corrugated strips. It, in the form of clean oil, passes through the rivets into the center tube. It then flows off through passages 31, 27, 29 to the delivery conduit.

In the above description the filter element has been referred to as of paper. It should be explained that the paper to be used is specially treated to serve as a filtering element. Since the present invention is not directed to the specific paper used nor to its preparation, it is unnecessary to go into detail as to this. The valve device in the center post marked by numerals 39, 41 is intended as an emergency by-pass. In the event that the paper becomes clogged so that oil cannot reach the center tube, the developed pressure within the casing causes the oil to flow through passages 35 and 33, through the valve, and by way of passage 37 to the space between the post and center tube.

I claim:

1. A filter having a casing with inlet and outlet openings, a filter element therein comprising a center tube connected to one of said openings, a double layer of fibrous material wrapped about said tube, said tube having a plurality of radial apertures, a fastener extending through said double layer and being secured to said tube in alignment with one of said apertures to clamp the double layer to said tube, a cut-out portion in said fastener providing a fluid passage therethrough, said passage extending longitudinally of the fastener from a point between the layers of fibrous material to the interior of said tube, whereby a fluid passage is provided through the layers of the fibrous material and through the innermost layer of said double layer and said tube aperture.

2. The invention defined by claim 1, there being a mesh separator between said layers of material.

3. The invention defined by claim 1, there being a wire mesh separator between said layers and a metallic collector manifold within the inner end of said double layer of material and between the layers thereof and through which said fastener passes whereby the collector manifold is secured in position.

4. A filter element comprising a tube with an opening through its wall, a double layer of filter material spirally wrapped about said tube, separator means positioned between said layers of filter material to provide a passage, the inner end of said double layer of filter material being in surface contact with said tube and covering said opening, a fastener secured to said double layer of filter material and to said tube adjacent said opening, a hole in said inner layer of filter material in alignment with one of said tube openings and a cut-out portion in said fastener in alignment with said hole and connecting said passage to said tube opening for fluid flow.

5. A filter element as defined in claim 4 in which said securing means is a split rivet with the head engaging the outer layer of said double layer of filter material and the split shank secured to said tube and providing said passage.

6. A filter element as defined in claim 4 together with a spacing strip wrapper spirally about the center tube between and spacing the convolutions of said double layer of filter material.

7. A filter comprising a housing, a post disposed in and attached to said housing, a tube surrounding said post for part of its length, an aperture in said tube, filtering means covering said aperture, sealing means between said post and tube on each side of said aperture providing a sealed space between the tube and post, inlet and outlet openings in said housing, a conduit connecting said space with one of said openings to provide a flow of filtered fluid to said opening from said other opening and through said filtering means, a second conduit adjacent said filter means connecting said space with the interior of said housing and a one way valve therein to provide a parallel flow from said first opening to said second opening whereby said filter means is by-passed.

8. A filter comprising a housing a post positioned in said housing, a tube shorter than said post surrounding said post, an aperture in said tube, a double layer of fibrous filter material wrapped about said tube, spacing means between said double layer and the perimeter of said double layer being secured together, securing means attaching said double layer of filter material to said tube at said aperture, conduit means in said securing means connecting the space between the double layer and said aperture, sealing means between said tube and said post on each side of said aperture providing a chamber separated from said housing, inlet and outlet openings in said housings, conduit means in said post connecting said chamber with one of said openings, said post being attached and sealed to said housing around said one opening.

9. A filter comprising a housing, a post disposed in said housing, a tube surrounding said post for part of its length, an aperture in said tube, filtering means covering said aperture, sealing means between said post and tube on each side of the aperture in said tube, and providing a sealed space between said tube and post, inlet and outlet openings in said housing, said post being attached and sealed to said housing around one of said openings, a conduit in said post connecting said space with said one opening, a second conduit in said post connecting said space between said post and tube and the interior of said housing, a one-way valve in said second conduit to provide a by-pass for connecting the inlet of the casing to the outlet by means of said second conduit, said one-way valve, said space and said first-named conduit.

10. The invention defined in claim 9, said filtering means comprising a double layer of filter material secured together at the perimeter and wrapped about said tube, means providing a passage between said double layers, and means connecting said passage to said aperture and securing said double layer to said tube.

HERBERT G. KAMRATH.

REFERENCES CITED

The following references are of record in the file of this patent:

UNITED STATES PATENTS

| Number | Name | Date |
| --- | --- | --- |
| 1,742,743 | Worbois | Jan. 7, 1930 |
| 1,742,768 | Kamrath | Jan. 7, 1930 |
| 1,805,903 | Bull | May 19, 1931 |
| 1,821,082 | Tyler | Sept. 1, 1931 |
| 1,909,308 | Nugent | May 16, 1933 |
| 1,918,980 | Nugent | July 18, 1933 |
| 1,937,415 | Sidney | Nov. 28, 1933 |
| 2,081,353 | Dick | May 25, 1937 |
| 2,158,512 | Layte | May 16, 1939 |
| 2,168,124 | Hurn | Aug. 1, 1939 |
| 2,221,465 | Aldham | Nov. 12, 1940 |